(12) United States Patent
Ito et al.

(10) Patent No.: US 10,666,110 B2
(45) Date of Patent: May 26, 2020

(54) BUS BAR UNIT

(71) Applicant: HONDA MOTOR CO., LTD., Tokyo (JP)

(72) Inventors: Yuta Ito, Saitama (JP); Hidetomo Fujiwara, Saitama (JP); Takuya Yoshizawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/214,342

(22) Filed: Dec. 10, 2018

(65) Prior Publication Data
US 2019/0207461 A1 Jul. 4, 2019

(30) Foreign Application Priority Data

Dec. 28, 2017 (JP) .................................. 2017-254252

(51) Int. Cl.
*H02K 1/32* (2006.01)
*H02K 3/50* (2006.01)
*H01R 9/22* (2006.01)
*H02K 3/24* (2006.01)
(Continued)

(52) U.S. Cl.
CPC ............... *H02K 3/50* (2013.01); *H01R 4/029* (2013.01); *H01R 9/223* (2013.01); *H02K 3/24* (2013.01); *H02K 3/38* (2013.01); *H02K 2203/09* (2013.01)

(58) Field of Classification Search
CPC ...... H02K 2203/09; H02K 5/225; H02K 3/50; H02K 3/38; H02K 3/52; H02K 2211/03; H02K 2213/03; H02K 3/24; H01R 9/223; H01R 4/029
See application file for complete search history.

(56) References Cited

U.S. PATENT DOCUMENTS 7,579,732 B2 * 8/2009 Yamaguchi ............... H02K 3/50
310/43
9,325,213 B2 * 4/2016 Egami ..................... H02K 5/225
9,419,491 B2 * 8/2016 Egami ....................... H02K 3/50
(Continued)

FOREIGN PATENT DOCUMENTS

JP 2001-173762 A 6/2001
JP 2011-030288 A 2/2011
(Continued)

OTHER PUBLICATIONS

Sep. 3, 2019, Japanese Office Action issued for related JP Application No. 2017-254252.
(Continued)

*Primary Examiner* — Thanh Lam
(74) *Attorney, Agent, or Firm* — Paratus Law Group, PLLC

(57) ABSTRACT

A bus bar unit includes: a plurality of bus bars which electrically connect coils of respective phases of a rotating electric machine and an external power source to each other, and integrally form external connection terminals; and a bus bar integral holding portion which covers parts of the plurality of bus bars and electrically insulates the plurality of bus bars to each other. Each bus bars is equal in thickness from the external connection terminal to a bus bar joining portion joined to a coil joining portion of each phase, and a width of the bus bar joining portion is wider than that of the coil joining portion.

6 Claims, 8 Drawing Sheets

(51) Int. Cl.
    *H02K 3/38*         (2006.01)
    *H01R 4/02*         (2006.01)

(56) References Cited

U.S. PATENT DOCUMENTS

| | | |
|---|---|---|
| 2014/0183993 A1 | 7/2014 | Takasaki |
| 2016/0336829 A1* | 11/2016 | Haruno ................ H02K 3/522 |
| 2017/0110929 A1 | 4/2017 | Egami et al. |
| 2017/0294815 A1* | 10/2017 | Yokoi .................... H02K 3/44 |
| 2018/0040392 A1* | 2/2018 | Fujiwara ................ H01B 5/02 |

FOREIGN PATENT DOCUMENTS

| | | |
|---|---|---|
| JP | 2017-079528 A | 4/2017 |
| JP | 2017-192194 A | 10/2017 |
| WO | WO 2013/042248 A1 | 3/2013 |

OTHER PUBLICATIONS

Jan. 21, 2020, Japanese Office Action issued for related JP Application No. 2017-254252.

* cited by examiner

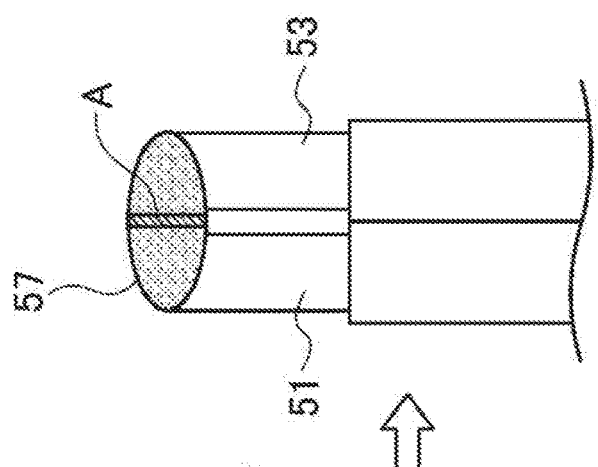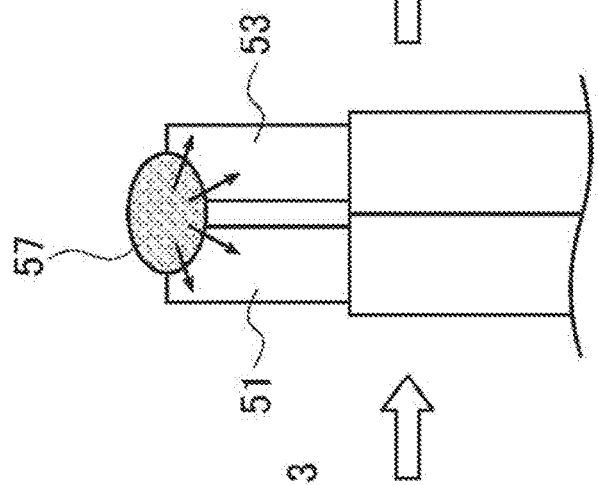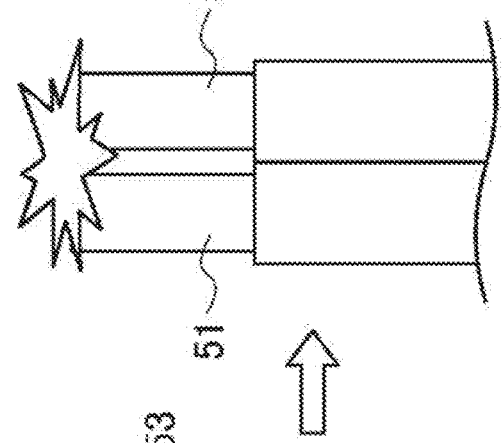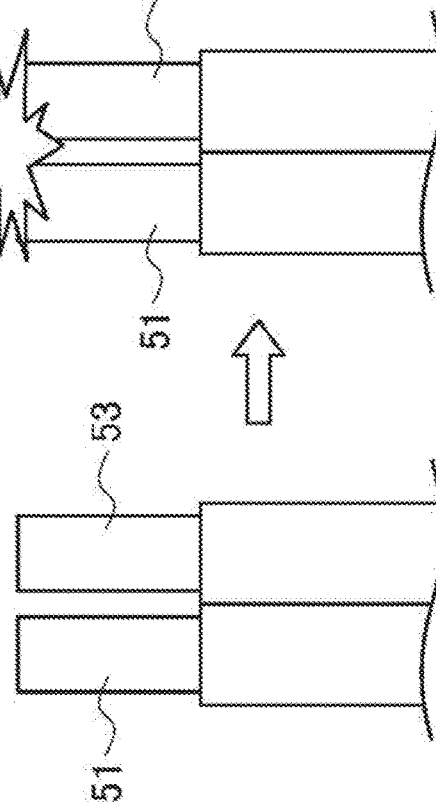

BUS BAR UNIT

CROSS-REFERENCE TO RELATED APPLICATIONS

The present application claims the benefit of priority of Japanese Patent Application No. 2017-254252, filed on Dec. 28, 2017, the content of which is incorporated herein by reference.

TECHNICAL FIELD

The present invention relates to a bus bar unit of a rotating electric machine.

BACKGROUND ART

In a rotating electric machine, coils of respective phases are electrically connected separately to an external power supply by power lines, in such a manner that electric power is supplied to the coils of respective phases from the external power supply. JP-A-2017-79528 discloses a connection component where linear conductors corresponding to coils of respective phases are integrally connected by a resin molded portion. In addition, a terminal portion fastened to a terminal block has a crimp terminal and the linear conductors of the same phase are caulked and joined.

However, in the configuration of JP-A-2017-79528, it is difficult to position the linear conductor when molding the resin molded portion, whereby a manufacturing process becomes complicated and the joining quality is difficult to stabilize. Also, after assembling to the rotating electric machine, the linear conductor is liable to bend and deform due to vibration or the like, and thus it is difficult to secure durability. Furthermore, when the coils of respective phases and the linear conductors are subjected to welding, it is necessary to crush a joining portion into a flat shape in order to secure a joint area. Accordingly, the number of parts increases and a crimping process becomes necessary, thereby an increase in the manufacturing cost.

For this reason, it is considered to use a bus bar having higher rigidity than a linear conductor as a power line for connecting a rotating electric machine and an external power source. According to this configuration, a joining process can be simplified and the durability after assembly can be improved. On the other hand, when there are variations in the position and posture of bus bars when assembling, the joining quality between the bus bars and coils of respective phases deteriorates.

SUMMARY

The present invention provides a bus bar unit capable of improving a joining quality between bus bars and coils of respective phases.

According to an aspect of the present invention, there is provided a bus bar unit including: a plurality of bus bars which electrically connect coils of respective phases of a rotating electric machine and an external power source to each other, and integrally form external connection terminals; and a bus bar integral holding portion which covers parts of the plurality of bus bars and electrically insulates the plurality of bus bars to each other, wherein: each bus bars is equal in thickness from the external connection terminal to a bus bar joining portion joined to a coil joining portion of each phase; and a width of the bus bar joining portion is wider than that of the coil joining portion.

Effects

According to the present invention, the width of the bus bar joining portion is set to be wider than the width of the coil joining portion in such a manner that even when there are variations in the position or posture of a bus bar unit, it is possible to appropriately join a bus bar joining portion and a coil joining portion, whereby the joining quality can be improved.

BRIEF DESCRIPTION OF THE DRAWINGS

FIGS. 7A to 7D are explanatory views for explaining a joining process between the coil joining portion and the bus bar joining portion.

DETAILED DESCRIPTION OF EMBODIMENT

First, the overall configuration of a rotating electric machine where a bus bar unit according to an embodiment of the present invention is mounted will be described with reference to FIG. 1.

Figure 1:
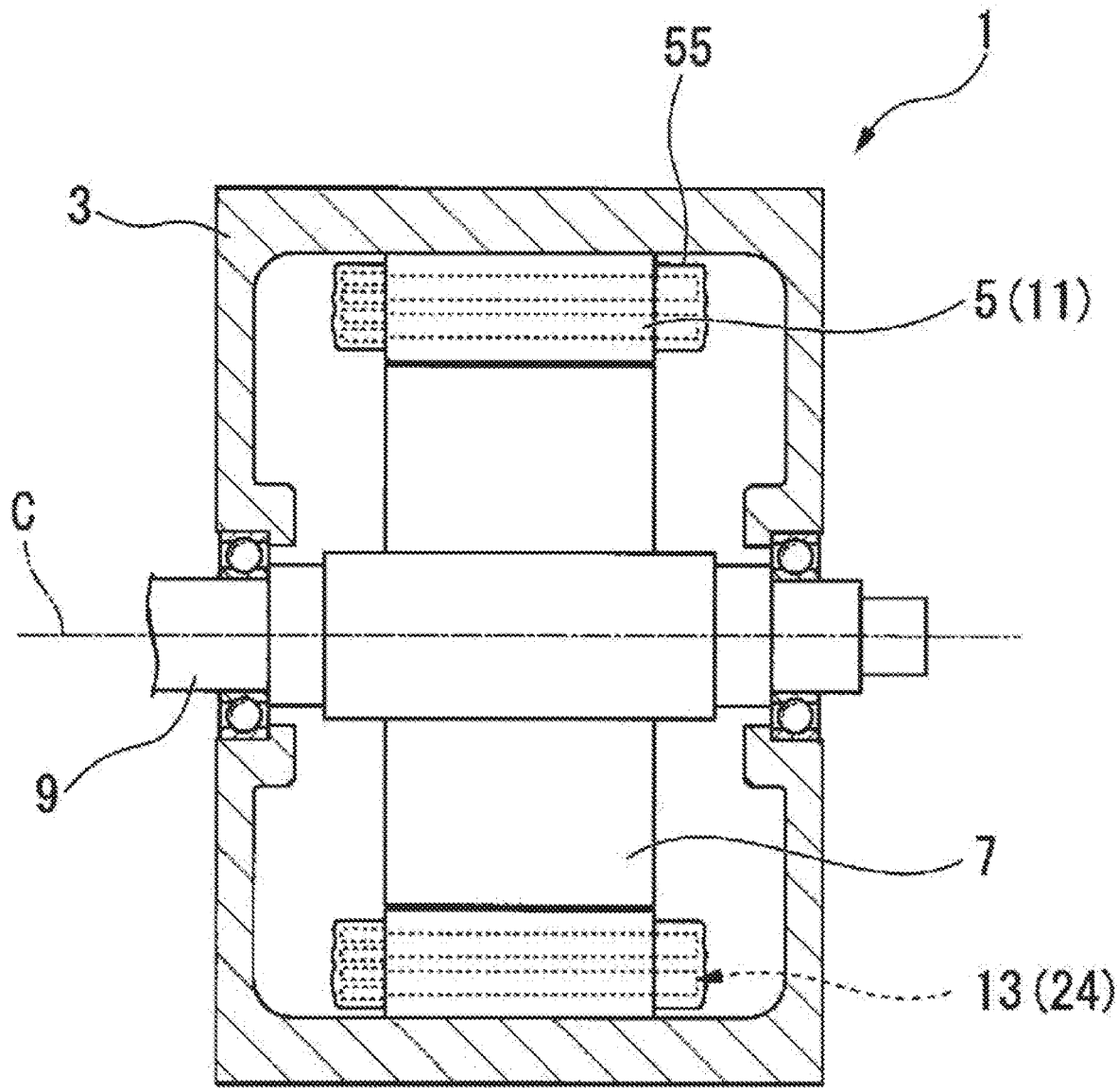
FIG. 1 is a cross-sectional view illustrating an overall configuration of a rotating electric machine where a bus bar unit according to an embodiment of the present invention is mounted.

A rotating electric machine 1 illustrated in FIG. 1 is a motor for travelling which is mounted on a vehicle such as a hybrid vehicle or an electric vehicle. However, the configuration of the present invention is applicable not only to the motor for travelling but also to a motor for generating electric power, a motor for other purposes, or a rotating electric machine (including a generator) other than for a vehicle.

In this description, in order to simplify the explanation, front and back, left and right, and upper and lower sides of the rotating electric machine 1 are defined as illustrated in the drawings and the forward direction, the rearward direction, the right direction, the left direction, the upward direction, and the downward direction are respectively indicated as Fr, Rr, R, L, U, and D. However, the directions illustrated in the drawings are irrelevant to the directions of a vehicle or the like where the rotating electric machine 1 is mounted.

The rotating electric machine 1 includes a case 3, a stator 5, a rotor 7, and an output shaft 9. The output shaft 9 is supported on the case 3 to be rotatable about an axis C. The rotor 7 is formed in a cylindrical shape fitted over the output shaft 9.

Figure 2:
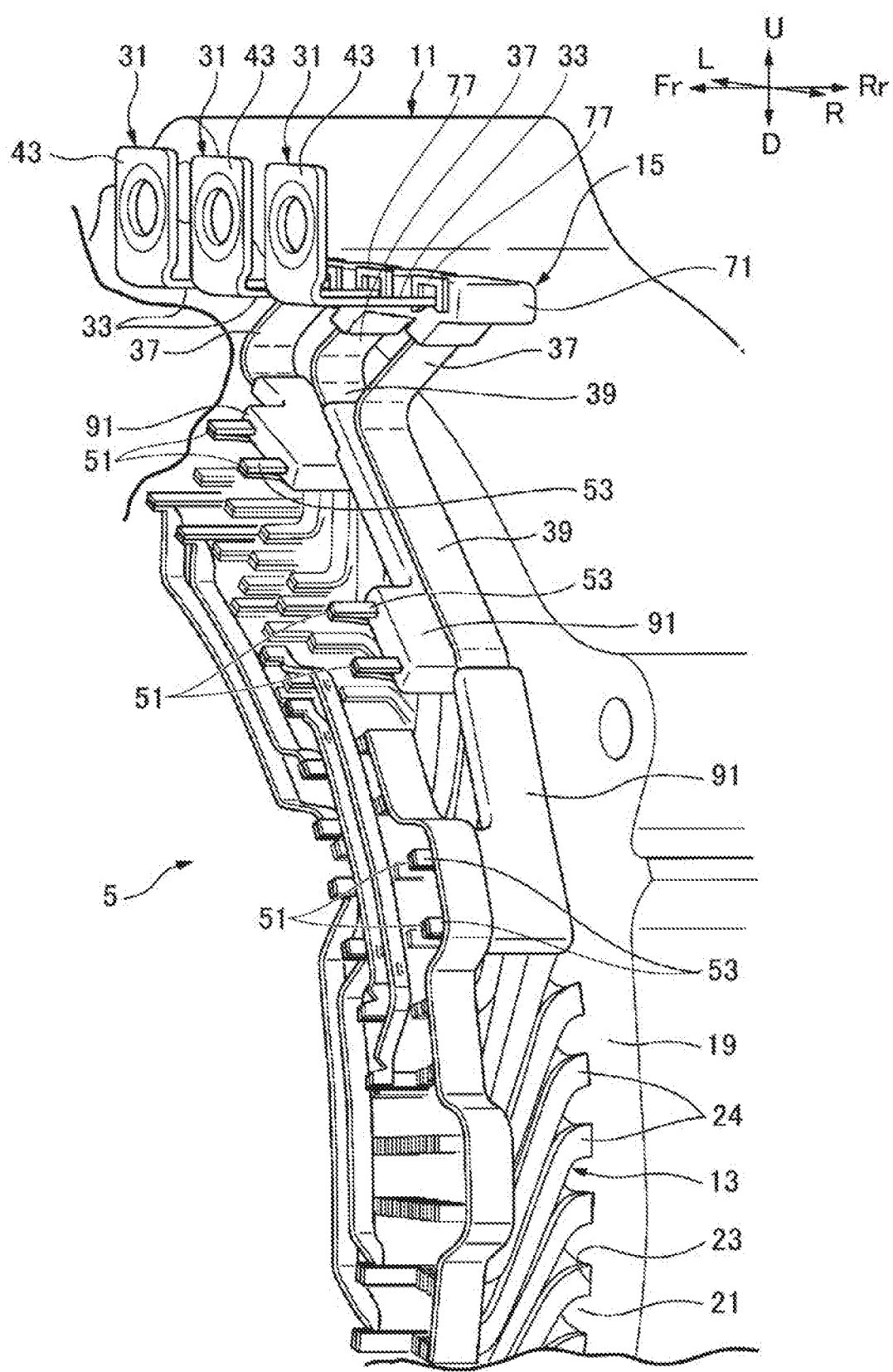
FIG. 2 is a partial perspective view of a stator of the rotating electric machine of FIG. 1.

As illustrated in FIG. 2, the stator 5 includes a stator core 11, a coil 13 mounted on the stator core 11, and a bus bar unit 15 for connecting the coil 13 and an external power source (not illustrated). The coil 13 of the stator 5 is cooled by a coolant dripped from above.

The stator core 11 is formed in a cylindrical shape which surrounds the rotor 7 (see FIG. 1) from outside in a radial direction. Specifically, the stator core 11 has a core main body 19 of a cylindrical shape and a teeth portion 21. The core main body 19 is fixed to the case 3 (see FIG. 1) described above with a fastening member such as a bolt.

The teeth portion 21 protrudes radially inward from an inner circumferential surface of the core main body 19. A plurality of teeth portions 21 are formed at intervals in the circumferential direction. A slot 23 through which the coil 13 is inserted is formed between the teeth portions 21 adjacent to each other in the circumferential direction. That is, the slot 23 passes through the stator core 11 in an axial direction.

The coils 13 are three-phase coils including a U phase, a V phase, and a W phase. The coil 13 of each phase of the present embodiment is formed by connecting a corresponding plurality of segment coils 24 to each other. Each segment coil 24 is inserted into the slot 23 of the stator core 11 and attached to the stator core 11. The in-phase segment coils 24 are joined to each other at one side in the axial direction of the stator core 11 by TIG welding, laser welding, or the like.

The configuration of the coil 13 can be appropriately changed. For example, the coil 13 may be attached to the stator core 11 not only by the segment coils 24 but also by winding it around the teeth portion 21 or the like. Further, although the coil 13 of the present embodiment is attached to the stator core 11 by distributed winding, it is not limited to this configuration and it may be attached to the stator core 11 by concentrated winding.

Figure 3:
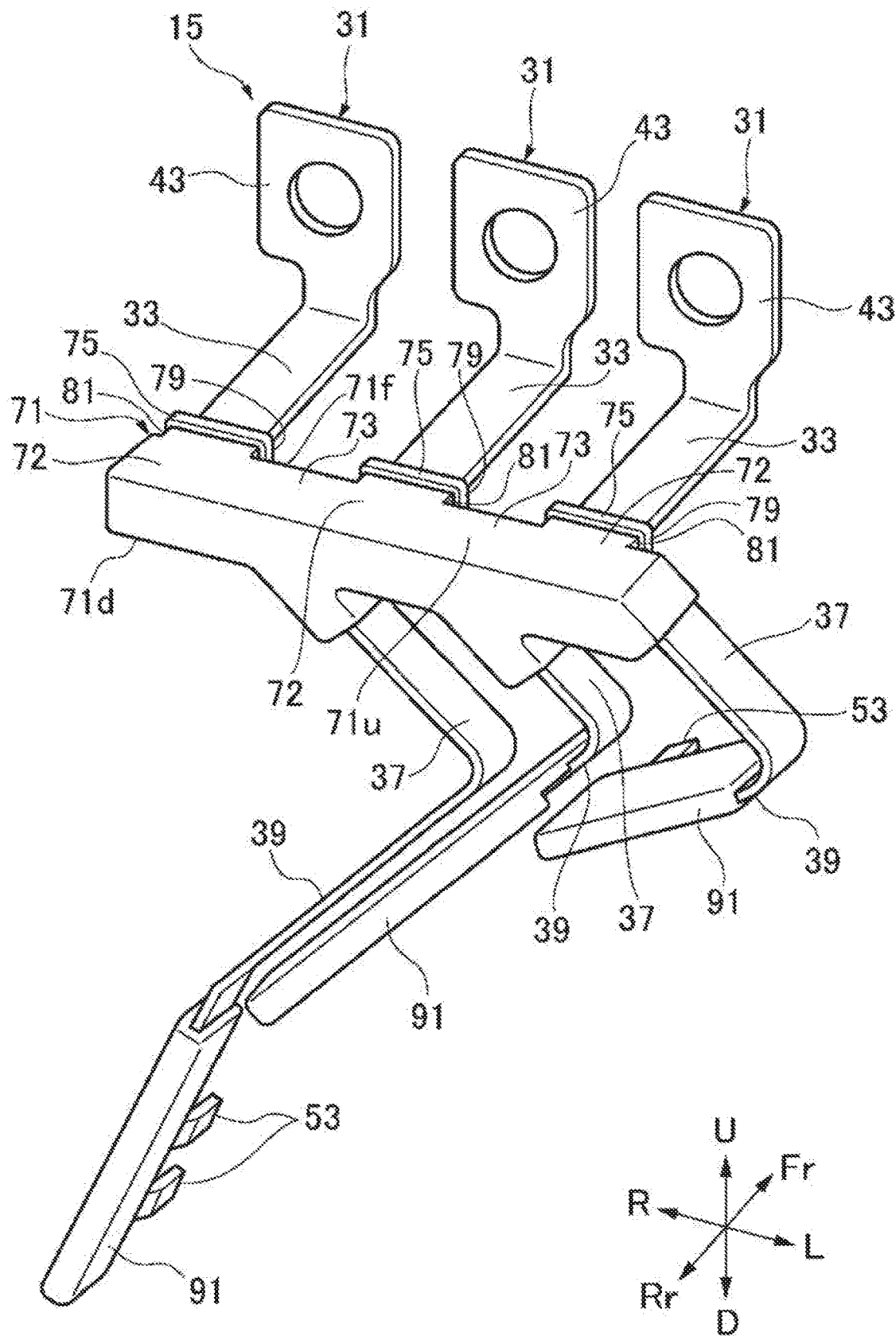
FIG. 3 is a perspective view of the bus bar unit according to the embodiment of the present invention as viewed from a rear upper side.
Figure 4:
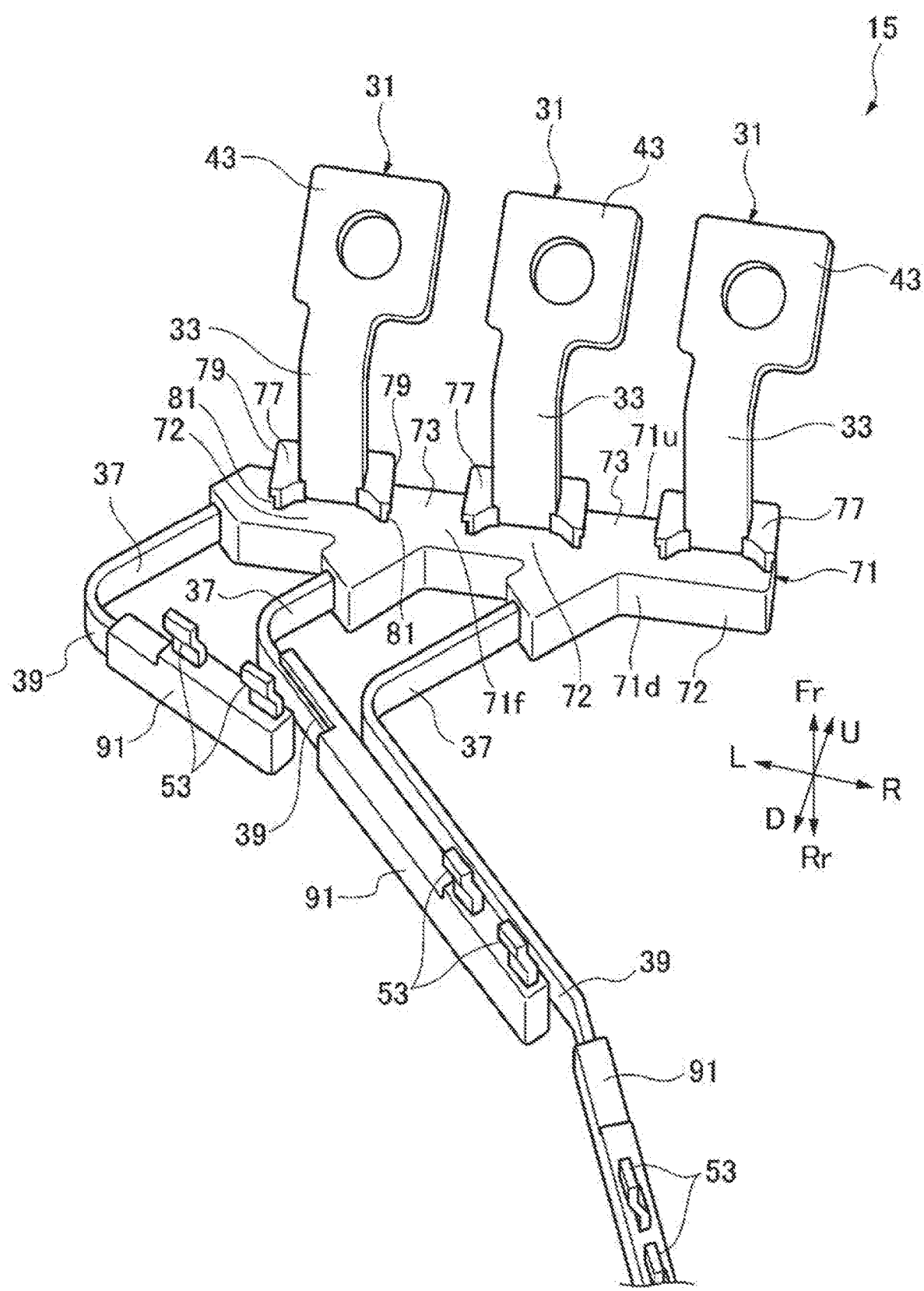
FIG. 4 is a perspective view of the bus bar unit of FIG. 3 as viewed from a front lower side.

As illustrated in FIGS. 2 to 4, the bus bar unit 15 includes a plurality of bus bars 31, a bus bar integral holding portion 71, and a plurality of separate body covering portions 91.

Each bus bar 31 is formed into a three-dimensional shape by subjecting a plate material having electrical conductivity such as metal (for example, copper) to sheet metal working. Respective bus bars 31 are arranged side by side in the right-left direction. Respective bus bars 31 are formed in a shape corresponding to each other. Therefore, in the following description, one bus bar 31 will be described as an example. In the other bus bar 31, portions corresponding to those of one bus bar 31 are denoted by the same reference numerals and description thereof will not be repeated.

The bus bar 31 includes a first extending portion 33, a second extending portion 37 connected to the first extending portion 33, and a third extending portion 39 connected to the second extending portion 37.

The first extending portion 33 extends in a forward direction (a first direction) from the bus bar integral holding portion 71. An external connection terminal 43 is continuously formed to a front tip of the first extending portion 33. The external connection terminal 43 extends in an upward direction (a U direction) from the front tip of the first extending portion 33. The external connection terminal 43 is electrically connected to a terminal block of the external power source (not illustrated). As illustrated in FIG. 2, the first extending portion 33 extends horizontally where flat portions thereof are oriented in an up-down direction, and thus a coolant for cooling or a foreign matter contained in the coolant tends to be deposited on the top surface of the first extending portion 33.

An upper end portion of the second extending portion 37 is connected to a rear end portion of the first extending portion 33. The second extending portion 37 extends from the rear end portion of the first extending portion 33 in a direction (second direction) intersecting with an extending direction of the first extending portion 33. Specifically, the second extending portion 37 extends obliquely leftward as it extends downward.

An upper end portion of the third extending portion 39 is connected to a lower end portion of the second extending portion 37. The third extending portion 39 extends from the lower end portion of the second extending portion 37 in a direction intersecting with an extending direction of each of the extending portions 33 and 37 described above. Specifically, the third extending portion 39 extends obliquely rightward as it extends downward.

A bus bar joining portion 53 is formed in the lower end portion of the third extending portion 39. The bus bar joining portion 53 extends forward from the lower end portion of the third extending portion 39.

The bus bar 31 is processed by press-forming a single metal plate and the thicknesses of the external connection terminal 43, the first extending portion 33, the second extending portion 37, the third extending portion 39, and the bus bar joining portion 53 are equal. This makes it possible to reduce the number of parts.

As illustrated in FIG. 2, the bus bar joining portion 53 of each bus bar 31 is individually joined to a coil joining portion 51 of corresponding phase coil 13 (segment coil 24) which is pulled out to one side at the axial direction of the stator core 11.

Figure 6:
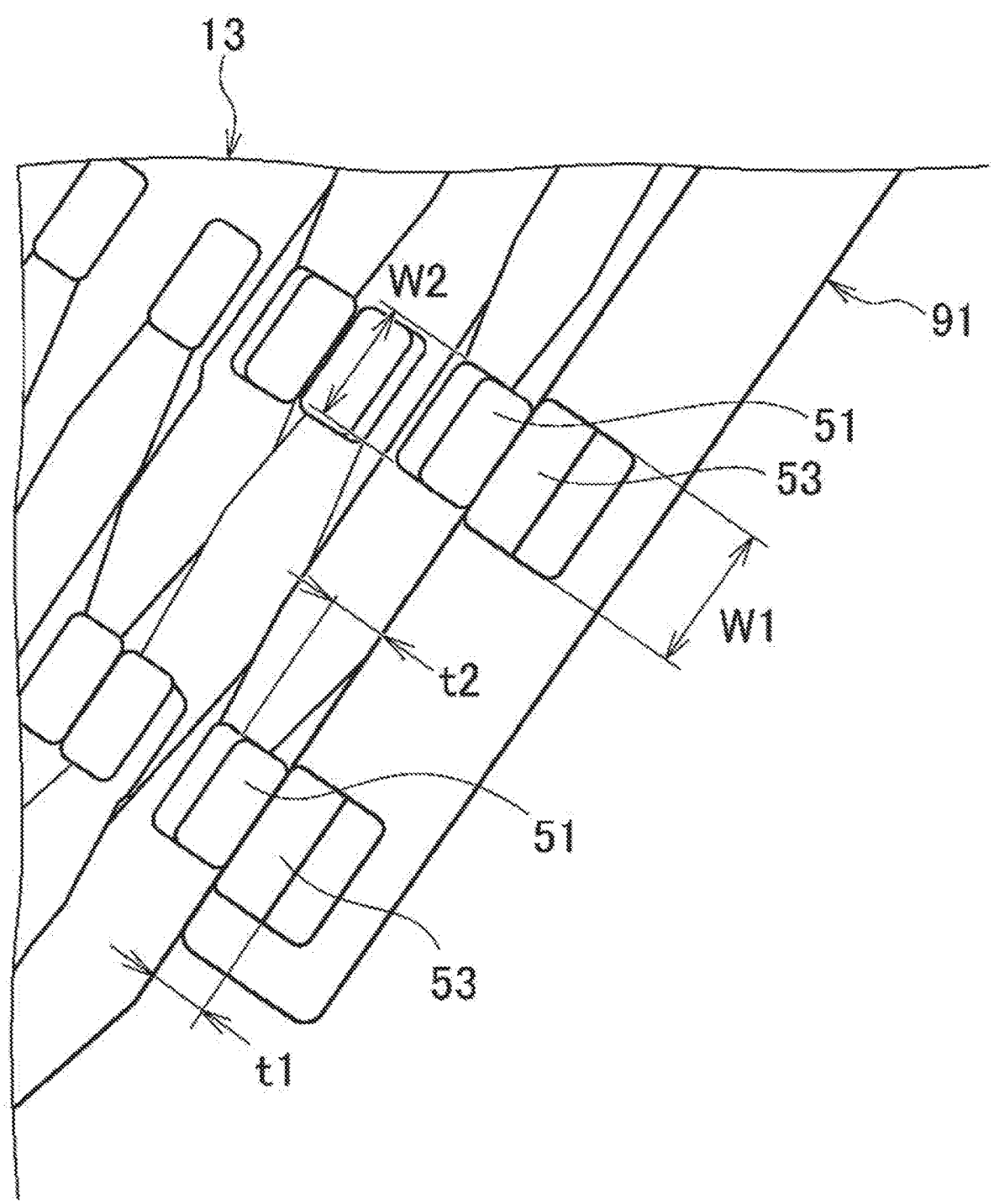
FIG. 6 is a partially enlarged view of a stator illustrating a joined state of a bus bar joining portion and a coil joining portion as viewed from a front direction.

As illustrated in FIG. 6, the bus bar joining portion 53 and the coil joining portion 51 are joined by making surfaces extending in a direction perpendicular to a plate thickness direction being brought into surface-contact with each other. A width W1 of the bus bar joining portion 53 is wider than a width W2 of the coil joining portion 51. Therefore, although the position or posture of the bus bar unit 15 varies, the bus bar joining portion 53 and the coil joining portion 51 can be appropriately joined, whereby the joining quality can be enhanced.

A thickness t1 of the bus bar joining portion 53 is set to be equal to a thickness t2 of the coil joining portion 51. When the thickness t1 of the bus bar joining portion 53 is different from the thickness t2 of the coil joining portion 51, there is a possibility that a melted portion 57 is biased and a size of the joint cross-sectional area is reduced.

Figure 8A:
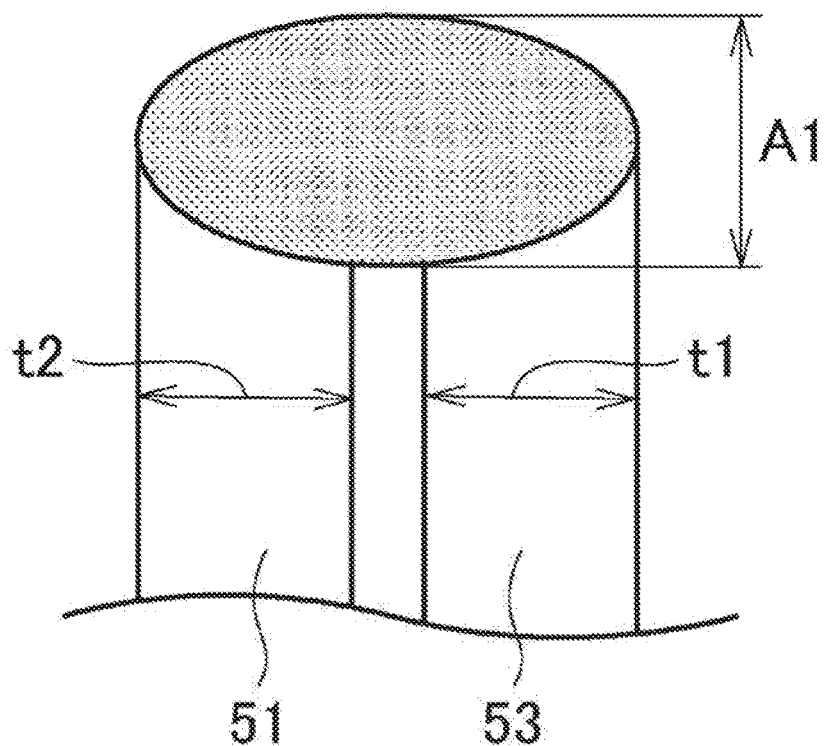
FIG. 8A is a view illustrating a joint cross-sectional area when the thickness of the bus bar joining portion is equal to that of the coil joining portion.
Figure 8B:
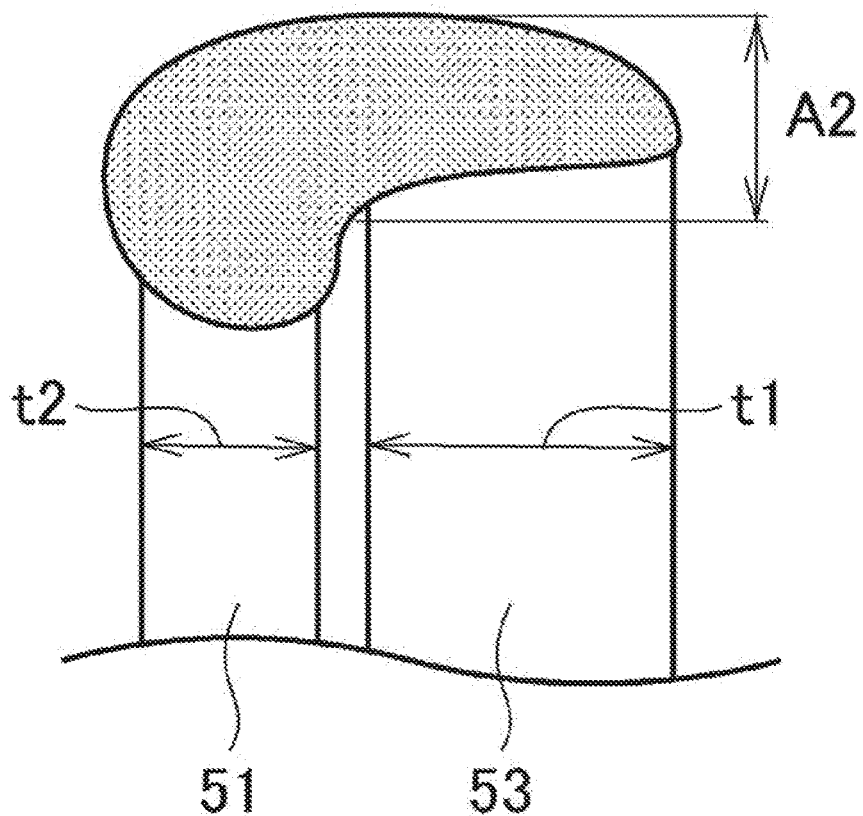
FIG. 8B is a view illustrating a joint cross-sectional area when the thickness of the bus bar joining portion and the thickness of the coil joining portion are different.

Specifically, as illustrated in FIGS. 7A to 7D, the joining process is performed as follows. First, the coil joining portion 51 and the bus bar joining portion 53 are arranged side by side (FIG. 7A and a welding gun is applied to the boundary surface between the coil joining portion 51 and the bus bar joining portion 53 (FIG. 7B, and then the coil of the melted portion 57 is melted (FIG. 7C) and the joining is completed by cooling (FIG. 7D). The joining quality between the coil joining portion 51 and the bus bar joining portion 53 depends on a joint cross-sectional area A of the boundary surface. As illustrated in FIG. 8A, when the joint cross-sectional area, while the thickness t1 of the bus bar joining portion 53 and the thickness t2 of the coil joining portion 51 are the same, is set to A1, a joint cross-sectional area A2, while the thickness t1 of the bus bar joining portion 53 is different from the thickness t2 of the coil joining portion 51, is smaller than the joint cross-sectional area A1 as illustrated in FIG. 8B (A2<A1).

As described above, the melting amounts at the time of joining the bus bar joining portion 53 and the coil joining portion 51 are being equaled by making the thickness t1 of the bus bar joining portion 53 equal to the plate thickness t2 of the coil joining portion 51 whereby the joining strength can be increased.

Therefore, the external power supply and the coil 13 of each phase are electrically connected for each phase by each bus bar 31. Electric power is supplied to the coil 13 from the external power supply through the bus bar 31.

As illustrated in FIG. 1, a part of the coil 13 which protrudes in the axial direction from the stator core 11 and a part of the bus bar unit 15 (around the bus bar joining portion 53) are powder-coated (powder coating portion 55 in FIG. 1). The powder coating portion 55 is formed by, for example, supplying insulative-powder particles (powder coating material) with fluidity and, further heating and thermosetting the powder particles.

Figure 5:
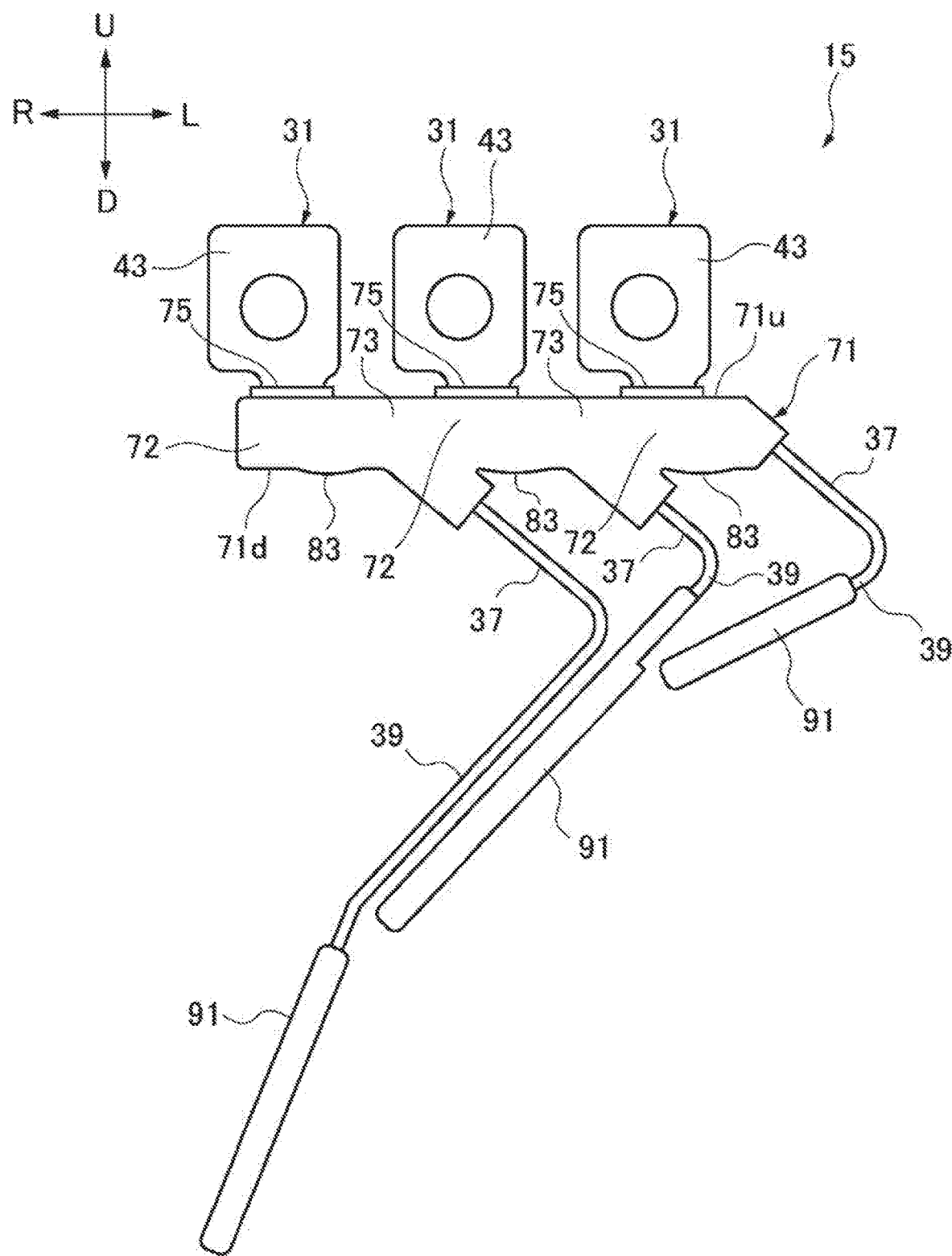
FIG. 5 is a side view of the bus bar unit as viewed from a rear direction.

As illustrated in FIGS. 3 to 5, the bus bar integral holding portion 71 collectively molds the bus bars 31 where the respective bus bars 31 are positioned at intervals in the right-left direction. Specifically, the bus bar integral holding portion 71 has covering portions 72 and a connecting portion 73 connecting the covering portions 72 to each other.

The covering portion 72 holds a rear end portion of the first extending portion 33 of each bus bar 31 and an upper end portion of the second extending portion 37. The connecting portion 73 is formed between the covering portions 72 adjacent to each other in the left-right direction. The surface of the connecting portion 73 is smoothly connected to the surface of the covering portion 72.

The first extending portion 33 extends from the front side surface (hereinafter, front surface 71f) of the bus bar integral holding portion 71 and the second extending portion 37 extends in the second direction intersecting with the first direction from a lower surface 71d of the bus bar integral holding portion 71. A weir portion 75 is provided at the boundary portion between an upper surface 71u of the bus bar integral holding portion 71 and the first extending portion 33.

More specifically, the front surface 71f of the bus bar integral holding portion 71 is provided with a substantially gate-shaped protrusion portion 77 to surround each first extending portion 33 separately. In a front tip of the protrusion portion 77, the weir portion 75 is provided at the boundary portion between the upper surface 71u of the bus bar integral holding portion 71 and the first extending portion 33. The weir portion 75 prevents the dripped coolant from flowing along the upper surface 71u of the bus bar integral holding portion 71 toward the first extending portion 33. As a result, foreign matters contained in the coolant is prevented from accumulating on the first extending portion 33 of the bus bar 31.

In the front tip of the protrusion portion 77, a guide wall 79 continuous from the weir portion 75 is provided on the left-right surfaces of the walls. As a result, a coolant flow path 81 is formed between the front surface 71f of the bus bar integral holding portion 71 and the guide wall 79. The protrusion portion 77, that is, the coolant flow path 81, extends further on the lower side than the lower surface of the first extending portion 33. Further, the inner surface of the substantially gate-shaped protrusion portion 77 is formed in a substantially V shape opening downward from the first extending portion 33 as seen from the front.

Therefore, the coolant blocked by the weir portion 75 is guided by the guide wall 79 and flows downward through the coolant flow path 81, whereby foreign matters contained in the coolant can be reliably moved away from the first extending portion 33 together with the coolant.

As illustrated in FIG. 5, the lower surface 71d of the bus bar integral holding portion 71 is provided with a plurality of bulging portions 83 which bulge downward. Accordingly, the coolant actively falls from the bulging portion 83 and does not remain in the bus bar integral holding portion 71.

The embodiment described above can be appropriately modified, improved, or the like.

For example, a cap formed of an insulating material is attached to cover a part of each bus bar 31 extending from the first extending portion 33 to the second extending portion 37, and then the cap may be insert-molded with the bus bar integral holding portion 71.

In addition, at least the following subjects are described in this description. Although the corresponding constituent element or the like in the embodiment described above are illustrated in parentheses, it is not limited thereto.

(1) A bus bar unit (bus bar unit 15) which includes a plurality of bus bars (bus bars 31) which electrically connect coils (coils 13) of respective phases of a rotating electric machine (rotating electric machine 1) and an external power source and integrally form external connection terminals (external connection terminals 43) and a bus bar integral holding portion (bus bar integral holding portion 71) which covers parts of the plurality of bus bars and electrically insulates the plurality of bus bars to each other, in which the bus bar is equal in thickness (thickness t1) from the external connection terminal to a bus bar joining portion (bus bar joining portion 53) joined to a coil joining portion (coil joining portion 51) of each phase, and a width (width W1) of the bus bar joining portion is wider than a width (width W2) of the coil joining portion.

According to (1), the width of the bus bar joining portion is set to be wider than the width of the coil joining portion, in such a manner that, although there are variations in the position or posture of a bus bar unit, it is possible to appropriately join a bus bar joining portion and a coil joining portion, whereby the joining quality can be improved.

(2) The bus bar unit according to (1), in which a thickness (thickness t1) of the bus bar joining portion is equal to a thickness (thickness t2) of the coil joining portion.

According to (2), the thickness of the bus bar joining portion is set to be equal to that of the coil joining portion in such a manner that the melting amounts, at the time of joining, are to be equaled, whereby the joining strength can be increased.

(3) The bus bar unit according to (1) or (2), in which a plurality of first extending portions (first extending portions 33) which extend in a first direction and are connected to external connection terminals of respective bus bars are extended from one side surface (front surface 71f) of the bus bar integral holding portion, a plurality of second extending portions (second extending portions 37) which extend in a second direction intersecting with the first direction are extended from a lower surface (lower surface 71d) of the bus bar integral holding portion, and weir portions (weir portions 75) are provided at boundary portions in relation to the plurality of first extending portions on an upper surface (upper surface 71u) of the bus bar integral holding portion.

According to (3), since the weir portions are provided at the boundary portions in relation to the plurality of first extending portions on the upper surface of the bus bar integral holding portion, it is possible to prevent foreign matters contained in the coolant from accumulating on the first extending portion of the bus bar, and thus occurrence of a short circuit can be prevented.

(4) The bus bar unit according to (3), in which protrusion portions (protrusion portions 77) are provided on the one side surface of the bus bar integral holding portion to surround the plurality of first extending portions separately, the protrusion portion is provided with the weir portion and a guide wall (guide wall 79) continuous from the weir portion, and a coolant flow path (coolant flow path 81) is formed between the one side surface of the bus bar integral holding portion and the guide wall.

According to (4), since the protrusion portions are provided on the one side surface of the bus bar integral holding portion to surround the plurality of first extending portions separately and a coolant flow path is formed between the guide wall continuous from the weir portion provided in the protrusion portion and the one side surface of the bus bar integral holding portion, foreign matters contained in the coolant can flow along the coolant flow path together with the coolant.

(5) The bus bar unit according to (4), in which the coolant flow path extends further on a lower side than a lower surface of the first extending portion.

According to (5), since the coolant flow path extends further on a lower side than the lower surface of the first extending portion, foreign matters contained in the coolant can be reliably moved away from the first extending portion.

(6) The bus bar unit according to any one of (3) to (5), in which a bulging portion (bulging portion 83) which bulges downward is provided on the lower surface of the bus bar integral holding portion.

According to (6), since the bulging portion which bulges downward is provided on the lower surface of the bus bar integral holding portion, it is possible to control the flow of the coolant so that the coolant actively drops from the bulging portion.

The invention claimed is:

1. A bus bar unit comprising:
a plurality of bus bars which electrically connect coils of respective phases of a rotating electric machine and an external power source to each other, and integrally form external connection terminals; and
a bus bar integral holding portion which covers parts of the plurality of bus bars and electrically insulates the plurality of bus bars to each other, wherein:
each bus bars is equal in thickness from the external connection terminal to a bus bar joining portion joined to a coil joining portion of each phase; and
a width of the bus bar joining portion is wider than that of the coil joining portion.

2. The bus bar unit according to claim 1, wherein
a thickness of the bus bar joining portion is equal to that of the coil joining portion.

3. The bus bar unit according to claim 1, wherein:
a plurality of first extending portions which extend in a first direction and are connected to external connection terminals of respective bus bars are extended from one side surface of the bus bar integral holding portion;
a plurality of second extending portions which extend in a second direction intersecting with the first direction are extended from a lower surface of the bus bar integral holding portion; and
weir portions are provided at boundary portions in relation to the plurality of first extending portions on an upper surface of the bus bar integral holding portion.

4. The bus bar unit according to claim 3, wherein:
protrusion portions are provided on the one side surface of the bus bar integral holding portion to surround the plurality of first extending portions separately;
the protrusion portion is provided with the weir portion and a guide wall continuous from the weir portion; and
a coolant flow path is formed between the one side surface of the bus bar integral holding portion and the guide wall.

5. The bus bar unit according to claim 4, wherein
the coolant flow path extends further on a lower side than a lower surface of the first extending portion.

6. The bus bar unit according to claim 3, wherein
a bulging portion which bulges downward is provided on the lower surface of the bus bar integral holding portion.

* * * * *